Patented May 29, 1951

2,554,511

UNITED STATES PATENT OFFICE 2,554,511

BASIC ESTERS OF 2-ARYL-2-(1-HYDROXY-CYCLOPENTYL)ETHANOIC ACID AND ACID ADDITION SALTS OF THE SAME

Gino R. Treves, New York, N. Y., assignor to Schieffelin & Co., New York, N. Y., a corporation of New York No Drawing. Application May 20, 1949, Serial No. 94,534

11 Claims. (Cl. 260—473)

This invention relates to compounds having mydriatic activity, and specifically to dialkylamino alkyl esters of 2-aryl-2-(1-hydroxycyclopentyl)ethanoic acids and to acid addition salts of the same. The aryl radical is chosen from the group consisting of phenyl and alkoxyphenyl.

One of the drawbacks of atropine, which is one of the best known mydriatic agents, is that its mydriatic activity is in many cases much more prolonged than is desirable. The present compounds possess advantageous mydriatic properties to a degree comparable to that of atropine but of a more practical duration, the mydriatic effect lasting but a few hours, as compared to a duration of up to a week for atropine. The time of onset and development of full mydriasis is also considerably shorter than for atropine. The compounds are further valuable as antispasmodics.

A specific example of one of the present compounds is beta-(dimethylamino)ethyl ester of 2-phenyl-2-(1-hydroxycyclopentyl)ethanoic acid, the hydrochloride of which may be written structurally as follows:

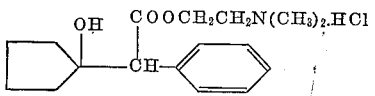

As stated, the phenyl group may contain alkoxy substituents such as methoxy, ethoxy, etc., preferably containing up to six carbon atoms. In the ester moiety of the above compound, by which is meant the —$CH_2CH_2N(CH_3)_2 \cdot HCl$ portion, other groups having three, four, five, six, etc. carbon atoms, preferably not more than six, may replace the ethylene and/or methyl groups. The hydroxycyclopentyl group may be replaced by alkyl-substituted hydroxycyclopentyl groups, with the alkyl substituent preferably containing one to six carbon atoms. Other acid addition salts besides the hydrochloride are the sulfate, nitrate, phosphate, acetate, etc.

The following examples may illustrate the preparation of the compounds.

Example 1

To a well stirred suspension of 9 gms. of sodium phenyl acetate and 2.4 gms. of magnesium turnings in 25 cc. of anhydrous ether, a solution of 9.4 cc. of isopropyl bromide in 50 cc. of anhydrous ether are added. The mixture is refluxed for one hour and then 5 cc. of cyclopentanone in 25 cc. of anhydrous ether are added dropwise. The mixture is then refluxed for one hour and poured over ice water containing some hydrochloric acid. The ether solution is separated and extracted with 200 cc. of 5% sodium hydroxide. The alkaline solution on acidification gives the free acid which is filtered off, dried in a desiccator and recrystallized from a mixture of ethylene dichloride and petroleum ether. The product is 2-phenyl-2-(1-hydroxycyclopentyl)ethanoic acid, melting at 95–97° C. Of this product, 4.5 gms. in 30 cc. of dry isopropyl alcohol are refluxed for 16 hours with 2.5 gms. of beta-chloroethyl dimethyl amine. The solution is cooled and filtered clear from the solid by-product. The solvent is removed under reduced pressure on the steam bath and the residue is washed with anhydrous ether. It is dissolved in ethyl acetate from which it crystallizes. It is the hydrochloride of beta-(dimethylamino)-ethyl ester of 2-phenyl-2-(1-hydroxycyclopentyl)ethanoic acid, melting at 134–136° C.

Example 2

To a well stirred mixture of 2.4 gms. of magnesium turnings and 10.8 gms. of sodium (4-methoxyphenyl)acetate covered with 20 cc. of anhydrous ether, 9.4 cc. of isopropyl bromide in 50 cc. of anhydrous ether are added dropwise. The mixture is refluxed for 1 hour and then 5 cc. of cyclopentanone in 25 cc. of anhydrous ether are added. The mixture is again refluxed for 1 hour and then poured over ice containing some hydrochloric acid. The ether solution is extracted with 200 cc. of 5% sodium hydroxide, and the resulting alkaline solution is acidified with hydrochloric acid. The precipitate formed is dissolved and recrystallized from benzene. It is 2-(4-methoxyphenyl)-2-(1-hydroxycyclopentyl) ethanoic acid, melting at 133°–134° C. Of this, 4.34 gms. in 30 cc. of dry isopropyl alcohol was refluxed for 16 hours with 2 gms. of beta-chloroethyl dimethyl amine. The cooled product of the reaction is filtered clear of the solid by-product and the solvent then removed under reduced pressure. The residue is washed with anhydrous ether. The oily residue is dissolved in ethyl acetate. The solid material formed is crystallized from a mixture of ethyl acetate and absolute ethanol. The product is the hydrochloride of beta-(dimethylamino)ethyl ester of 2-(4-methoxyphenyl)-2-(1-hydroxycyclopentyl)ethanoic acid. It melts at 165°–167° C.

The acid addition salt of Example 1 was tested in the rabbit eye and found to possess mydriatic activity. Definite measurable mydriasis was produced in less than 5 minutes, and complete dilatation was established in about 15 minutes, becoming submaximal after 2 hours. The pupil was essentially normal in 5 hours. The salt of Example 2 was effective in about 10 minutes, reached maximal dilatation in about 25 minutes and submaximal dilatation in about 1 hour. The pupil was essentially normal in about 3 hours. The compounds were tested in concentrations of 2% by weight in physiological saline solution. The reduced duration of activity of the compound of Example 2 is attributable to the presence of the alkoxy radical in the phenyl group.

The free bases may be obtained from the salts by treating the latter with an alkali such as an aqueous solution of sodium hydroxide, potassium hydroxide, sodium carbonate, etc. The salts are preferable over the free bases because of their solubility in water.

In the light of the foregoing description, the following is claimed:

1. A compound selected from the class consisting of dialkylamino alkyl ester of 2-aryl-2-(1-hydroxycyclopentyl) ethanoic acid and its acid addition salt, in which aryl is selected from the group consisting of phenyl and alkoxyphenyl, said alkyl and alkoxy groups each containing up to six carbon atoms.

2. Dialkylamino alkyl ester of 2-phenyl-2-(1-hydroxycyclopentyl) ethanoic acid, said alkyl groups each containing up to six carbon atoms.

3. The acid addition salt of dialkylamino alkyl ester of 2-phenyl-2-(1-hydroxycyclopentyl)-ethanoic acid, said alkyl groups each containing up to six carbon atoms.

4. Dialkylamino alkyl ester of 2-(alkoxyphenyl)-2-(1-hydroxycyclopentyl) ethanoic acid, said alkyl and alkoxy groups each containing up to six carbon atoms.

5. The acid addition salt of dialkylamino alkyl ester of 2-(alkoxyphenyl)-2-(1-hydroxycyclopentyl) ethanoic acid, said alkyl and alkoxy groups each containing up to six carbon atoms.

6. Beta-(dimethylamino)ethyl ester of 2-phenyl-2-(1-hydroxycyclopentyl) ethanoic acid.

7. The acid addition salt of beta-(dimethylamino)ethyl ester of 2-phenyl-2-(1-hydroxycyclopentyl) ethanoic acid.

8. Beta-(dimethylamino)ethyl ester of 2-(4-methoxyphenyl)-2-(1-hydroxycyclopentyl)-ethanoic acid.

9. The acid addition salt of beta-(dimethylamino) ethyl ester of 2-(4-methoxyphenyl)-2-(1-hydroxycyclopentyl) ethanoic acid.

10. A compound selected from the class consisting of

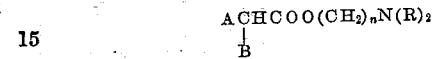

and its acid addition salt, in which A is a group selected from the class consisting of hydroxycyclopentyl and alkyl-substituted hydroxycyclopentyl groups, $n$ is a whole number varying from 1 to 6, R is an alkyl group, and B is a radical selected from the class consisting of phenyl and alkoxyphenyl radicals, said alkyl and alkoxy groups each containing up to 6 carbon atoms.

11. The acid addition salt of beta-(diethylamino)ethyl ester of 2-phenyl-2-(1-hydroxycyclopentyl) ethanoic acid.

GINO R. TREVES.

REFERENCES CITED

The following references are of record in the file of this patent:

UNITED STATES PATENTS

| Number | Name | Date |
| --- | --- | --- |
| 1,987,546 | Blankart | Jan. 8, 1935 |
| 2,346,027 | Hoffmann et al. | Apr. 4, 1944 |
| 2,404,588 | Martin et al. | July 23, 1946 |